Mar. 3, 1925.

P. STOHR

STEERING WHEEL LOCK

Filed July 7, 1924

Inventor

Paul Stohr

By Clarence A. O'Brien

Attorney

Mar. 3, 1925. 1,528,389
P. STOHR
STEERING WHEEL LOCK
Filed July 7, 1924 2 Sheets-Sheet 2
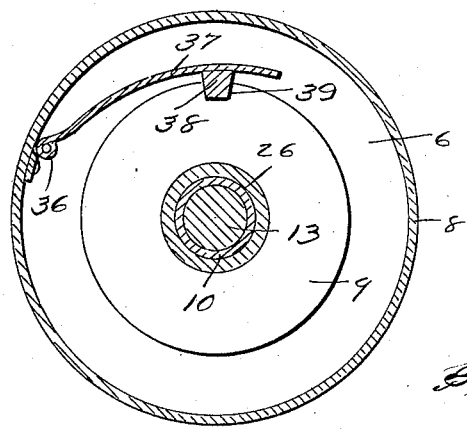
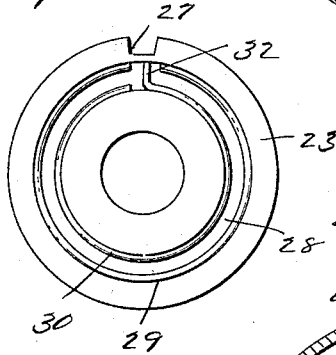
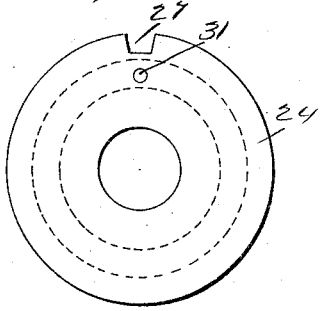
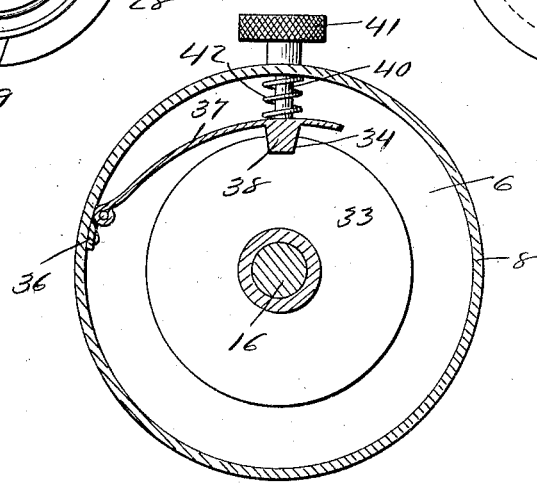
Inventor
Paul Stohr.
By Clarence A. O'Brien
Attorney Patented Mar. 3, 1925.

1,528,389

UNITED STATES PATENT OFFICE.

PAUL STOHR, OF RUSO, NORTH DAKOTA.

STEERING-WHEEL LOCK.

Application filed July 7, 1924. Serial No. 724,670.

*To all whom it may concern:*

Be it known, that I, PAUL STOHR, a citizen of the United States, residing at Ruso, in the county of McLean and State of North Dakota, have invented certain new and useful Improvements in Steering-Wheel Locks, of which the following is a specification.

This invention relates to new and useful improvements in steering wheel locks for automobiles, and has for its principal object to provide a simple and efficient means for preventing the steering post being turned by any unauthorized person.

Another important object of the invention is to provide a steering wheel lock of the above mentioned character, which includes a means for rendering the steering wheel idle so that the turning thereof will not affect the steering post, means being further provided for locking the steering wheel into engagement with the steering post, by manipulating the proper combination, so that the vehicle may be driven.

Another important object of the invention is to provide a steering wheel lock of the permutation type, which will at all times, be positive and efficient in its operation, the device being simple in construction, inexpensive, strong and durable, and further well adapted for the purposes for which it is designated.

Other objects and advantages of this invention will become apparent during the course of the following description.

In the accompanying drawings, forming a part of this specification, and in which like numerals designate like parts throughout the same:

Figure 3 is a vertical section taken approximately upon the line 3—3 of Figure 2.

Figure 4 is a similar section taken upon the line 4—4 of Figure 2.

Figure 5 is a side elevation of one of the tumblers.

Figure 6 is a similar view, showing the opposite side of the tumbler.

Figure 1:
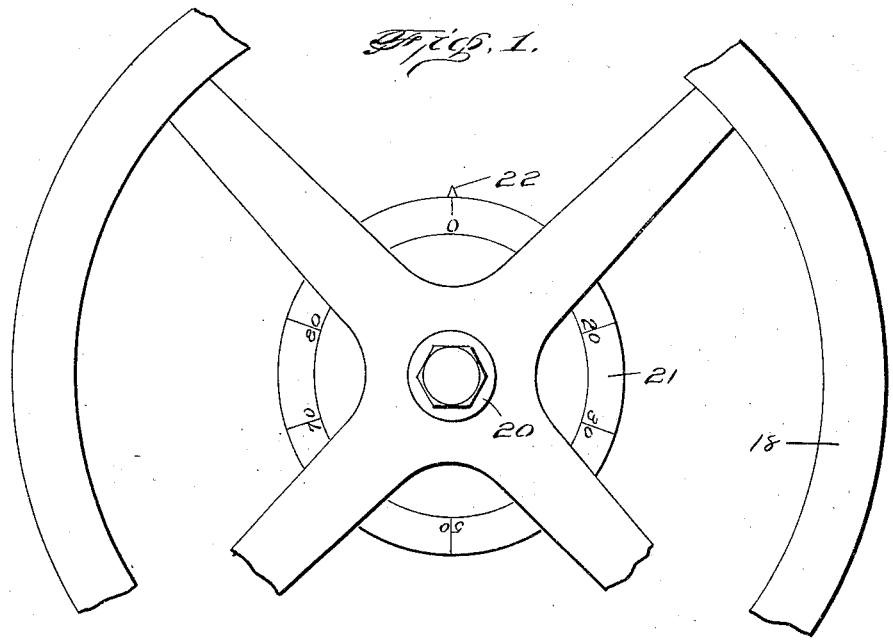
Figure 1 is a fragmentary plan view of a steering wheel and the dial carried thereby.
Figure 2:
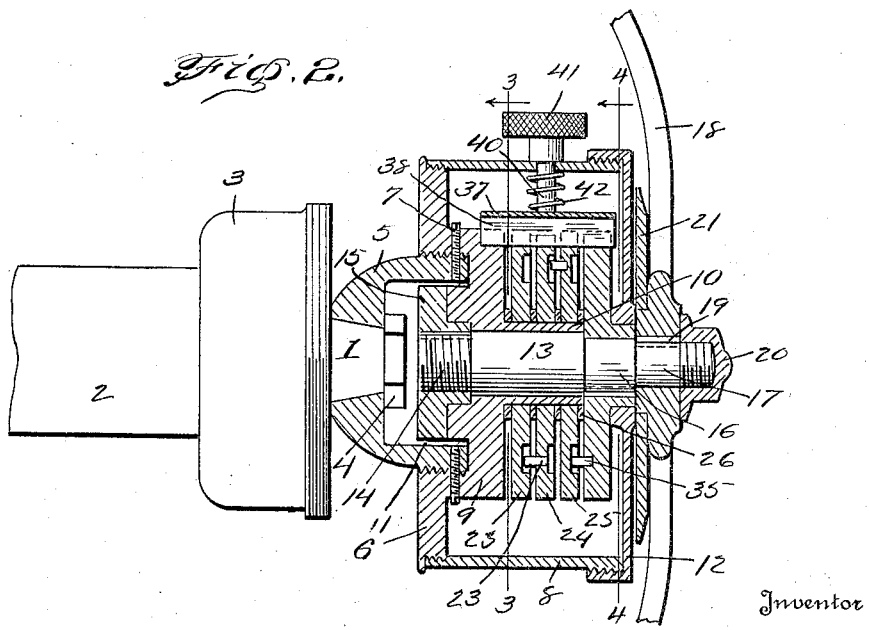
Figure 2 is a sectional view of the steering wheel lock, showing the same in position on the steering post.

In the drawings, wherein for the purpose of illustration is shown the preferred embodiment of my invention, the numeral 1 designates the stub end of the steering post of a motor vehicle, preferably of the Ford type, the casing for the steering post being illustrated at 2, and the housing or cap for the gearing associated with the steering post is shown at 3 in the drawing, with reference more particularly to Figure 2. Secured on the outer end of the steering post 1, by means of the nut 4, is the shell 5. The larger end of the shell is externally threaded, and provides a means for supporting thereon the casting 6. Fastening screws such as are shown at 7, are provided for securing the casting against rotary movement of the enlarged end of the shell 5, and each casting is threaded into the inner end of the cylindrical casing 8. The casting 6 is provided with a reduced portion 9, and extending outwardly therefrom is the tubular extension 10. The purpose of this construction will hereinafter be more fully described. It will, of course, be understood that the casting 6 is provided with an annular recess 11, in the outer face thereof so that the central portion of the casting and the reduced portion 9 thereof will extend into the shell 5, in the manner as illustrated in Figure 2.

The cover 12 is threaded on the outer end of the casing 8. Extending centrally through the casting 6, the reduced portion 9 and the tubular extension 10 thereof and through the cover 12 is the shaft 13. The inner end of the shaft is threaded as shown at 14, for the purpose of receiving the locking nut 15, to prevent the shaft 13 from moving outwardly from the casting. The nut 15 is disposed within the shell 5 and engages the outer face of the central portion of the casting 6, in the manner as clearly illustrated in Figure 2. The nut 15 is adapted to be keyed to the shaft 13 and is also adapted to rotate therewith. The intermediate portion of the shaft 13 at a point adjacent the end of the tubular extension 10 of the casting 6 is reduced, as illustrated at 16, and the other end of the shaft 13 is further reduced as shown at 17.

The reduced portion 17 of the shaft 13 extends beyond the cover 12 and provides a means for supporting the steering wheel 18 thereon. The steering wheel 18 is keyed to the reduced portion 17 of the shaft 13 by means of the key 19, and to further hold the steering wheel against displacement from the outer end of the shaft, I provide the slitted cap 20 which is threaded on the outer end of the shaft, in the manner as also illustrated in Figure 2. Carried by the steering wheel 18 is the dial plate 21 and arranged on the dial plate are the numerals which are used in locating the proper combination, in order to lock the steering wheel to the steering post, it being understood, of course, that the cover 12 is provided with a mark, such as is shown at 22, in order to permit the proper operation of the dial when operating the combination. The shaft 13 is adapted for rotation within the casing 8. Arranged on the tubular extension 10 of the casting 6 within the casing 8 are the spaced co-acting tumblers or discs 23, 24, and 25 respectively. Washers 26 are interposed between the tumblers, whereby the same are held in proper spaced relation with respect to each other and these washers 26 also extend around the tubular extension 10. Each of the tumblers is provided with a notch 27 and arranged in the outer face of each tumbler is the annular recess or groove 28. Spring elements, such as are shown at 29 and 30 respectively are arranged in the annular recess in each disc or tumbler and are spaced from each other, so as to provide a guide for the laterally extending pin 31, which is carried by the adjacent tumbler or disc. One of the ends of the spring element 30 extends transversely across the recess 28 as shown at 32, to provide a stop to be engaged by the pin 31 on the adjacent tumbler, whereby the several tumblers may be rotated upon the turning of the dial to the proper combination so that all of the notches in the tumbler will be in alignment in the manner hereinafter to be more fully described.

Keyed to the reduced portion 16 of the shaft 13 is the master or main tumbler or disc 33. The main or master tumbler is also provided with a notch 34, similar to the notches 27 provided within the beforementioned tumbler, and the notch 34 will also register with the notches 27 when all of the tumblers are in a predetermined position. The main tumbler 33 is further provided with the laterally projecting pin 35 similar to the pin 31 extending laterally from each of the discs mounted on the tubular extension 10. Of the pin 35 is adapted to engage with the annular recess provided in the outer face of the tumbler 25. Pivotally supported within the casing 8, as illustrated at 36, in Figures 3 and 4 of the drawings, is the plate 37, and a transversely extending rib 38 is formed on the under side of the plate adjacent the free end thereof. This rib is adapted to be disposed within the aligning notches in the tumbler, and also in a suitable notch 39 provided in the reduced portion 9 of the casting 6. For the purpose of actuating the plates 37 and the rib 38 carried thereby or moving the rib 38 out of engagement with the notches in the tumblers, a handle 40 extends upwardly from the plate adjacent the free end thereof and through the casing 8. A knurled head 41 is provided on the outer end of the handle 40 to provide a means for enabling a person to readily and easily operate the plate. For the purpose of normally holding the web in engagement with the registering notches in the tumblers, a coil spring 42 is provided, and the same encircles the handle 40 and is disposed between the casing 8 and the upper face of the plate 37. This construction is clearly illustrated in Figures 2 and 4 of the drawings.

With the parts arranged as shown in Figure 2 of the drawings, the steering wheel 18 will be locked to the casing 8 and to the steering post 1, through the medium of the shell 5, and the vehicle may be steered in the usual manner. When it is desired to lock the steering wheel so that the vehicle cannot be steered by any unauthorized person, the handle 40 is operated by raising upwardly on the knurled head 41, so that the rib 38 carried by the plate or plunger 37 will be brought out of registration with the notches in the tumblers. The steering wheel 18 is then given a turn, so as to cause the main tumbler 33 to rotate simultaneously causing the other tumblers 23, 24, and 25 respectively, to be rotated, through the medium of the pins 31 and 35, whereby the notches in the tumbler will be brought out of registry with each other and the shaft 13 will rotate freely within the casing. Should any person attempt to drive the motor vehicle when the steering wheel is out of locked engagement with the casing, the wheels of the vehicle cannot be turned and thus preventing any possibility of any unauthorized person stealing the vehicle.

The person knowing the proper combination may easily and readily turn the steering wheel so as to cause the tumbler to be brought into position, whereby all of the notches are in alignment with each other and the spring 42 will then cause the ribs 38 to move into engagement with the notches, thus causing the steering wheel to be locked in engagement with a casing. Through the medium of the casting 6 and of the casting secured to the steering post of the vehicle, by means of the shell 5, the operator may easily control the steering of the vehicle.

The simplicity with which my device is constructed enables the same to be readily and easily operated, and will furthermore be positive in its action. Furthermore the necessity of employing keys to lock or unlock the steering wheel is obviated.

While I have shown the preferred embodiment of my invention, it is to be understood that various changes in the size, shape and arrangement of parts may be resorted to, without departing from the spirit of the invention and the scope of the appended claims.

Having thus described my invention, what I claim is:

1. In combination with the steering post of a motor vehicle and the steering wheel, a casing mounted on the outer end of the steering post and adapted for rotation therewith, a shaft extending through the casing and rotatable therein, said steering wheel being keyed to the outer end of said shaft, rotatable tumblers loosely mounted on said shaft, a main tumbler keyed to said shaft, said tumblers having notches therein adapted to be brought into registry with each other, and means for locking the tumblers against rotation, whereby said shaft is locked to the casing to permit the turning of the steering post by the steering wheel.

2. In combination with the steering post of a motor vehicle and the steering wheel, a shell carried by the outer end of the steering post, a casing, a casting threaded in one end thereof and adapted to be threaded onto the outer end of the shell and adapted for rotation therewith, a cover threaded on the opposite end of the casing, a shaft extending through the casting, said shaft being adapted for rotatable movement in the casing, the steering wheel being keyed to the outer end of the shaft, and means for locking the shaft to the casting, whereby to permit the turning of the steering post by the steering wheel.

3. In combination with the steering post of a motor vehicle and the steering wheel, a shell carried by the outer end of the steering post, a casing, a casting threaded in one end thereof and adapted to be threaded onto the outer end of the shell and adapted for rotation therewith, a cover threaded on the opposite end of the casing, a shaft extending through the casting, said shaft being adapted for rotatable movement in the casing, the steering wheel being keyed to the outer end of the shaft, and means for locking the shaft to the casting whereby to permit the turning of the steering post by the steering wheel, said means comprising coacting tumblers rotatably associated with the casting, a main tumbler keyed to said shaft, said tumblers having notches therein adapted to be brought into registry with each other, and a spring pressed plunger in the casing adapted to seat in said registering plunger in the casing adapted to seat in said registering notches for interlocking the tumblers.

4. In combination with the steering post of a motor vehicle and a steering wheel, a shell carried by the outer end of the steering post, a casing, a casting threaded in one end thereof and secured to the outer end of the shell, said casting having a tubular extension disposed within the casing, a cover threaded on the opposite end of the casing, a shaft extending through the casting and tubular extension and through the cover of the casing and rotatable therein, the steering wheel being keyed to the outer end of the shaft, means on the opposite end of the shaft for preventing the displacement thereof, a plurality of co-acting tumblers rotatable on the tubular extension on said casting, a main tumbler for said shaft, said tumblers having notches arranged therein, means for bringing the notches in the tumblers into registry with each other, and means for locking the tumblers on the tubular extension of the casting to the main tumbler whereby the shaft is locked to the casting and said casing to permit the turning of the steering post by the steering wheel.

5. In combination with the steering post of a motor vehicle and a steering wheel, a shell carried by the outer end of the steering post, a casing, a casting threaded in one end thereof and secured to the outer end of the shell, said casting having a tubular extension disposed within the casing, a cover threaded on the opposite end of the casing, a shaft extending through the casting and tubular extension and through the cover of the casing and rotatable therein, the steering wheel being keyed to the outer end of the shaft, means on the opposite end of the shaft for preventing the displacement thereof, a plurality of co-acting tumblers rotatable on the tubular extension on said casting, a main tumbler for said shaft, said tumblers having notches arranged therein, means for bringing the notches in the tumblers into registry with each other, and means for locking the tumblers on the tubular extension of the casting to the main tumbler whereby the shaft is locked to the casing and said casing to permit the turning of the steering post by the steering wheel, said last mentioned means comprising a plate pivoted in the casing, a rib extending transversely of the under side of the plate adjacent the rear end thereof and adapted to seat in said notches, a handle extending upwardly from the free end of the plate to the casing, a coil spring for normally holding the rib in engagement with said notches, and a knurled head on the outer end of the handle for moving the rib out of engagement with the notches.

In testimony whereof I affix my signature.

PAUL STOHR.